Aug. 22, 1933.    N. A. MEARS    1,923,873
CLOSURE LATCH
Original Filed April 17, 1930
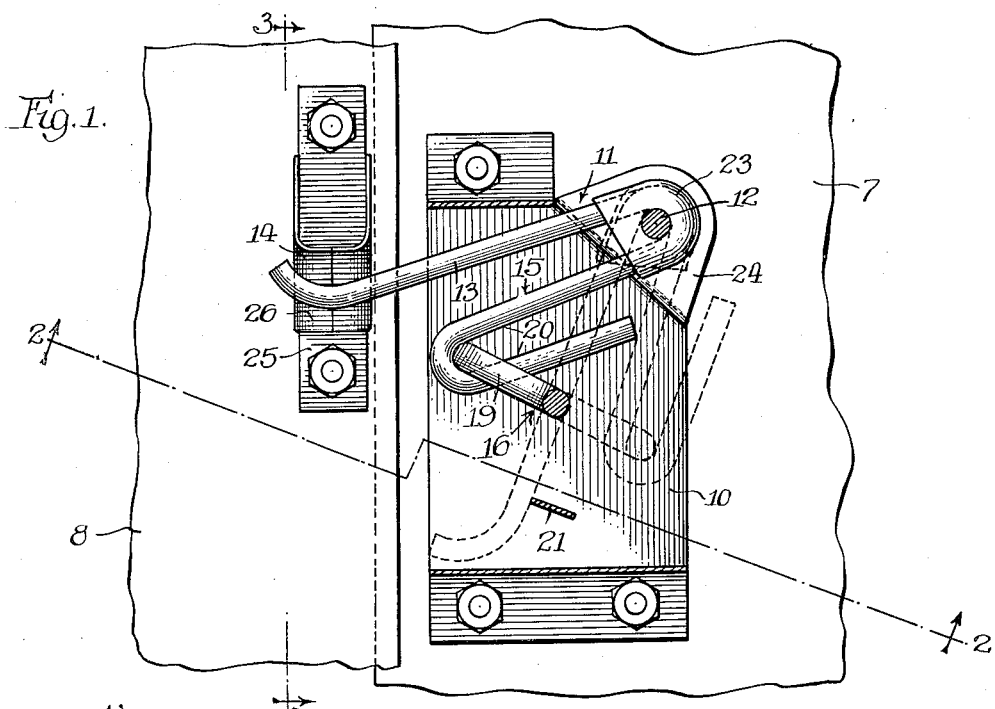
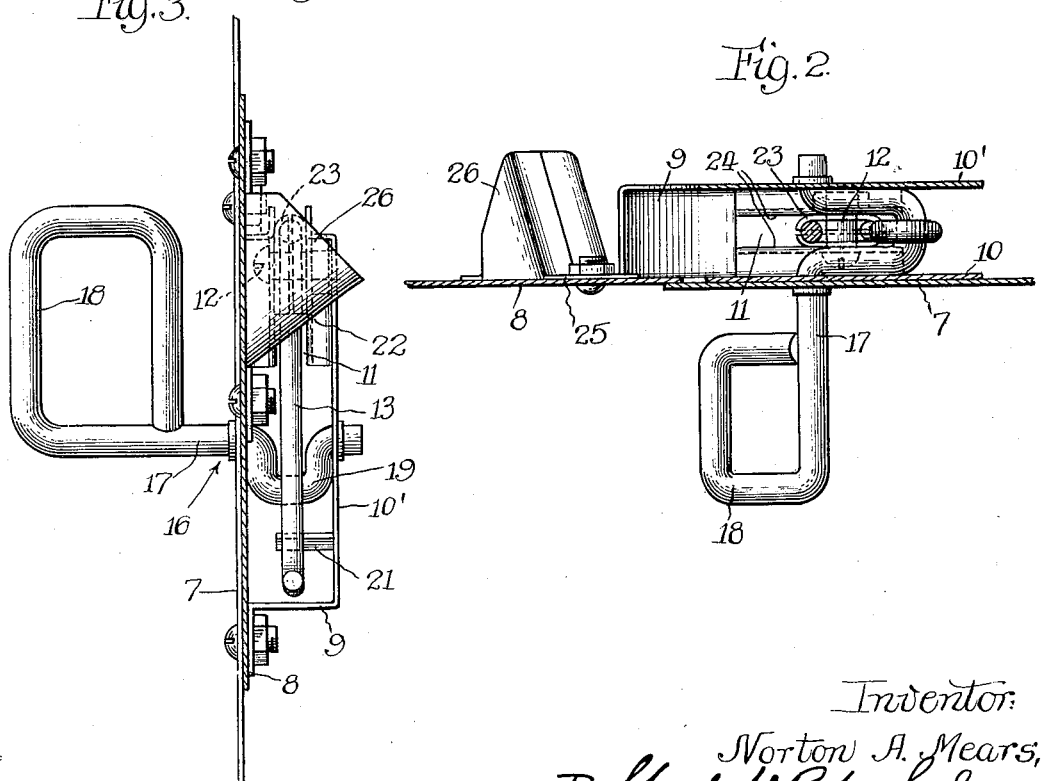
Inventor:
Norton A. Mears,
By Churchill, Parker & Carlson
Attys.

Patented Aug. 22, 1933

1,923,873

UNITED STATES PATENT OFFICE 1,923,873

CLOSURE LATCH

Norton A. Mears, Chicago, Ill., assignor to Chicago Forging & Manufacturing Co., Chicago, Ill., a Corporation of Illinois Application April 17, 1930, Serial No. 444,886
Renewed November 19, 1932

20 Claims. (Cl. 292—197)

The invention pertains to latches of the type employed in securing the movable cover of an automobile hood in position, and has more especial reference to that type of latch which is enclosed within the hood with an operating handle projecting exteriorly of the hood.

In the application of latches to the inside of an automobile hood, a consideration of primary importance is that the latch be constructed so as to consume a small amount of space on the inside of the hood cover. Thus it frequently happens as a result of variations in the arrangement of parts inside the hood that inside latch mechanisms extending into the hood any substantial distance cannot be used on account of interference with accessories mounted on the engine proper.

One object of my invention, therefore, is to provide a latch mechanism particularly adapted for use on the inside of an automobile hood in that the latch mechanism is constructed so that it shall at all times occupy a space small enough to avoid interference with other parts within the hood.

A further object of the invention is to provide a latch mechanism of this character which is capable of effectually securing the hood cover in position.

Another object is to provide a construction for the latch mechanism such that it can be manufactured economically and yet will serve its intended purpose effectually.

Still another object is to provide an inside latch mechanism which is operable by means of an outside handle with a construction and arrangement of the parts such that it is necessary to provide only a very small opening in the hood cover through which the handle may extend.

A further object is to provide a latch construction including means operable to retain the handle releasably in either extreme position, and one which will enable the handle to be used in lifting the cover when in unlatched relation to the hood proper.

While the invention is not limited in its application to automobile hoods, there its principal advantages are especially apparent, and therefore the latch will be set forth in the following description as it is applied to automobile hood covers. Also it will be understood that the invention is not limited to the particular construction and arrangement set forth, but is susceptible of various changes and modifications such as will doubtless occur to those skilled in the art, reference being made to the appended claims as defining the scope of the invention.

In the drawing:

Figure 1 is a vertical sectional view through a latch as applied to the inside of an automobile hood, of which fragmentary portions only are shown.

Fig. 2 is a sectional view taken approximately in the plane of line 2—2 of Fig. 1, but showing the latch member in a retracted position.

Fig. 3 is a vertical transverse sectional view taken approximately in the plane of line 3—3 of Fig. 1.

In the present embodiment the latch is illustrated as applied to the inside of an automobile hood of which 7 designates a section of the movable hood cover, and 8 a fixed member of the automobile, such as the cowl or radiator, defining the opening closed by the hood cover, one edge of the cover section being shown as slightly overlapping the fixed member. Mounted on the inside of either the cover section 7 or the fixed member 8 but preferably on the cover section is a relatively thin casing 9 having opposed parallel walls 10 and 10' spaced a short distance apart. Operable within this casing is a lever generally designated 11. This lever is fulcrumed between its ends on a pin 12, the opposite ends of which are supported in the two side walls of the casing at the upper end thereof and herein at the corner remote from the edge of the cover. One end portion of this lever extends through an open edge of the casing and constitutes a latch arm 13 of a length such as to be swingable across the joint formed by the overlapping of the fixed member by the hood section and into engagement with an abutment 14 constituting a keeper on the fixed member of the automobile.

The lever 11 is preferably formed from a heavy wire or rod of suitable resilient material which is bent to form in addition to the latch arm 13 an operating arm 15. The latter in turn is adapted for connection with the inner end of an operator generally designated 16.

The operator 16 comprises a shank 17 entered through a small hole in the cover section 7 and having at its outer end a handle 18 and at its inner end a double crank arm 19. In addition to its support in the cover section the crank is journaled at opposite sides thereof in the casing side plates 10 and 10'.

To provide an operative connection between the crank 19 and the operating arm 15 of the lever, the latter is bent upon itself to form an open ended slot 20 in which the crank arm is slidable during its rotation for the purpose of imparting a swinging movement to the latch arm 13.

In the operation of the latch the crank is adapted for rotation through approximately 180 degrees and the arrangement is such that when swung in the direction of the abutment 14 the latch arm 13 is swung into operative relation to the abutment, and when swung in the opposite direction or away from the abutment the latch arm is moved downwardly into a position within the casing 9. In either extreme position the crank arm occupies preferably a slightly over-center relation to the operating arm and preferably advantage is taken of the resiliency of the lever to hold the latch in one position or the other. Thus when the crank is moved into latching position, the free end thereof is adapted to engage with the abutment 14 slightly in advance of the movement of the crank arm to its extreme position in that direction, so that in the continued movement of the crank arm the lever is placed under tension. Thus not only is the crank firmly held in latching position, but the hood cover is securely held against upward movement. Similarly when the crank arm is operated in the opposite direction to disengage the latch, it strikes an abutment 21 in the casing 9, just prior to the movement of the crank arm into the extreme limit of its position in the direction mentioned; and in the continued movement of the crank arm to the end of its slot 20, that is to say, into or beyond dead center position, the lever is placed under tension to hold the parts in position.

In order that the latch may be effective to restrain the hood cover against outward movement, the lower surface of the keeper abutment 14 is inclined upwardly and inwardly as indicated clearly in Fig. 3 to form a cam surface 22. It will be apparent that by reason of this shape of the keeper coupled with the resiliency of the latch arm when under tension, the hood cover is drawn and held firmly in position in overlapping relation to the fixed member 8.

The bearing provided by the lever for engagement with the pin 12 is in the present instance provided by a loop in the lever formed as an incident to the arrangement of the operating arm 15 with respect to the latch arm 13. To hold the lever on this bearing a cup washer 23 is employed so as to provide a bearing surface opposed to that provided by the bight of the loop. This arrangement lends simplicity to the construction without increasing to any appreciable extent the width of the space consumed by the lever.

To prevent movement of the lever longitudinally of the pin 12, the portions of the opposite side walls of the casing in which the pin 12 is journaled are offset inwardly to form guides 24 which position the lever substantially centrally of the casing. Guiding the lever in this manner and also between the arms of the crank 19 maintains the lever substantially parallel to the cover section at all times.

The keeper abutment 14 may be constructed economically from sheet metal. Thus it may comprise a base plate 25 having integral with the opposite side edges thereof arms 26 which may be bent at their free ends into abutting relation to form the abutment.

It will be seen that I have provided a latch of advantageous character through the use of a lever which, because of its inherent resiliency is effective in maintaining the relatively movable parts of the hood or other structure firmly and securely in position, and which furthermore may be readily retained in either operative or inoperative position, being in the latter position especially useful as a lifting device for the hood. Moreover, the operator provided is of such character that only a very small opening need be formed in the hood cover, thus presenting a neat appearance from the outside of the hood.

I claim as my invention:

1. A latch for hood covers and the like, comprising, in combination, a fixed abutment, a resilient lever fulcrumed on the cover for rotation in a plane parallel to the cover, one arm of said lever being adapted for engagement with said abutment and the other arm having a longitudinal guideway of substantial length, and a crank journaled at one end in said cover and engaging said lever at the other end for reciprocation in said guideway.

2. A latch for hood covers and the like, comprising, in combination, a fixed abutment, a resilient lever fulcrumed on the cover for rotation in a plane parallel to the cover, one arm of said lever being adapted for engagement with said abutment and the other arm having a longitudinal guideway, and a crank journaled at one end in said cover and engaging said lever at the other end for reciprocation in said guideway, said crank being movable into over-center relation to said lever when the latter engages said abutment.

3. A latch for hood covers and the like, comprising, in combination with an abutment on one of the two parts to be connected, a resilient lever fulcrumed on the other part and limited in its movement in one direction by said abutment, means for limiting the movement of the lever in a direction away from said abutment, and a crank for operating said lever adapted to hold the latter under tension in either limit of its movement.

4. A latch for hood covers and the like, comprising, in combination with an abutment on one of the two parts to be connected, a resilient lever fulcrumed on the other part and limited in its movement in one direction by said abutment, means for limiting the movement of the lever in a direction away from said abutment, and a crank for operating said lever adapted to hold the latter under tension in either limit of its movement, said crank having a slidable connection with said lever and being movable into over-center relation thereto when the lever is at either end of its movement.

5. A latch for hood covers and the like comprising, in combination with a fixed abutment, a resilient lever having a latch arm and an operating arm extending adjacent to and parallel with each other, said lever being fulcrumed on the cover between said arms, and an over-center device for rotating said lever, comprising a crank journaled at one end in the cover and guided at the other end for movement longitudinally of the operating arm, said crank being proportioned and positioned relative to said operating arm to cause engagement of the latch arm with said abutment before said crank reaches a dead center relation to the operating arm.

6. In a latch for automobile hood covers and the like, the combination of a lever of resilient construction fulcrumed on one of the parts to be connected for rotation in a plane parallel thereto, a fixed abutment on the other part, one of said parts being a fixed portion of the automobile, and means for operating said lever into engagement with the abutment and adapted to hold the cover against relative movement parallel to the fixed part, said abutment and lever also coacting to hold the cover under tension against relative perpendicular movement.

7. A latch for an automobile hood comprising, in combination, an abutment projecting inwardly from a fixed member of the automobile, a lever of resilient construction fulcrumed on a section of the hood cover for movement in a plane parallel to the section, and means for rotating said lever into engagement with said abutment to prevent relative movement in one direction parallel to the fixed member, said abutment having a beveled surface engaged by said lever and adapted to cam said lever inward to hold the overlapping members under tension against relative perpendicular movement.

8. A latch for an automobile hood, comprising, in combination, an abutment projecting from the fixed member of the hood, a lever fulcrumed on a vertical section of the hood cover for projection across the overlapping edges of the members into engagement with said abutment, and a crank journaled in the hood cover and engaging said lever to rotate the same into engaging or retracted position, the handle of said crank being positioned relative to the lever engaging part to assume a vertical position when said lever is fully retracted.

9. A latch for an automobile hood, comprising, in combination, an abutment projecting from a fixed member of the automobile, a casing mounted on the hood cover adjacent said abutment, a lever fulcrumed in said casing, an over-center device for rotating said lever into or out of engagement with said abutment, and a part on said casing engaged by said lever whereby the over-center device is operative to lock the lever in retracted position, thereby adapting the handle of the device for use as a hood cover lifting means.

10. A latch for hood covers and the like, comprising, in combination with a keeper on one of the two parts to be connected, a lever of resilient construction swingable on the other part, and means for swinging said lever, said lever having an arm positively engaged by said means to swing said lever through a large angle and an extended latch arm providing a wide range of engagement of said lever with said keeper.

11. A latch for an automobile hood cover comprising, in combination, an abutment projecting from a fixed member of the automobile, a lever of resilient construction fulcrumed on a section of the hood for rotation in a plane parallel therewith, and an operator for rotating said lever into engagement with said abutment, said operator comprising a crank arm engaging at one end with said lever and at the other end with the hood section supporting said lever, the engagement at one end of said crank arm being a lost-motion connection permitting transverse movement of said crank arm into over-center relation.

12. A latch for an automobile hood cover comprising, in combination, an abutment projecting from one of the parts to be secured, a lever of resilient construction fulcrumed on the other part for rotation in a plane parallel therewith, and an operator for rotating said lever into engagement with said abutment, said operator in its final movement and after engagement of said lever with said abutment acting to distort said lever to assume a holding position relative thereto.

13. A latch for an automobile hood cover comprising, in combination, an abutment on a fixed member of the automobile, a lever fulcrumed on a section of the hood and having a portion adapted to be swung into engagement with said abutment and an operating portion, and a rotary operator journaled in the hood section supporting said lever and having a lost-motion connection with said operating portion, said two portions of the lever having a resilient connection to permit yieldable movement of the operating portion relative to the other portion when the latter engages the abutment.

14. A latch for an automobile hood cover comprising, in combination, a lever fulcrumed on a section of the hood for rotation in a plane parallel therewith, said lever having a guideway extending longitudinally thereof, a crank journaled at one end in the same section of the hood and sliding in the guideway in said lever at the other end, an abutment on the hood limiting the rotation of said lever by said crank in one direction, and an abutment on a fixed member of the automobile engaged by said lever in the opposite direction of rotation, said lever being of resilient construction to permit the crank by distortion of the lever to be rotated to over-center position with respect thereto and lock the lever in engagement with either abutment.

15. A latch for an automobile hood cover comprising, in combination, an abutment on a fixed member of the automobile, a lever fulcrumed on a section of the hood, said lever having one arm adapted to engage said abutment and the other arm formed with a longitudinal slot and of resilient construction, and a crank journaled at one end in the section supporting the lever and guided at the other end in said slot, said crank being operable to distort said yieldable arm after engagement of the other arm with said abutment in the movement of the crank to over-center position.

16. In an automobile having a fixed member defining an opening and a closure member for the opening, a latch for securing the closure comprising, in combination, an abutment projecting from one of the members, a lever of resilient construction fulcrumed on the other member and rotatable in a plane parallel with the closure member into engagement with said abutment, and means operable through said lever to hold the closure member in closed position under tension.

17. The combination of a fixed member defining an opening, a closure member for said opening, an abutment projecting from one of the members, a lever fulcrumed on the other member for rotation in a plane parallel to the member and adapted for engagement with said abutment, and an operator engaging said lever to rotate the same into engaging or retracted position and forming therewith an over center device, said device having one over center position whereby said lever is secured in engaging position and another over center position whereby said lever is secured in retracted position.

18. In an automobile having a fixed member defining an opening and a closure member for the opening, a latch for securing the closure comprising, in combination, an abutment projecting from one of the members, a lever of resilient construction fulcrumed on the other member and rotatable in a plane parallel with the closure member into engagement with said abutment, and means operable through said lever to hold the closure member in closed position under tension, said means including a handle exterior to the closure member, a handle shaft journalled in the closure member and a crank connection between said handle shaft and the lever.

19. In an automobile having a fixed member defining an opening and a closure member for the opening, a latch for securing the closure comprising, in combination, an abutment projecting from one of the members, a lever of resilient construction fulcrumed on the other member and rotatable in a plane parallel with the closure member into engagement with said abutment, and means operable through said lever to hold the closure member in closed position under tension, said means including a handle exterior to the closure member, a handle shaft journalled in the closure member and a crank connection between said handle shaft and the lever, said crank connection being adapted, when moved over center, positively to hold the lever in locking position.

20. In an automobile having a fixed member defining an opening and a closure member for the opening, a latch for securing the closure comprising, in combination, an abutment projecting from one of the members, a lever of resilient construction fulcrumed on the other member and rotatable in a plane parallel with the closure member into engagement with said abutment, and means operable through said lever to hold the closure member in closed position under tension, said lever including a spring loop one end of which is adapted to engage the latch abutment the other end being adapted to engage the lever holding means.

NORTON A. MEARS.